UNITED STATES PATENT OFFICE.

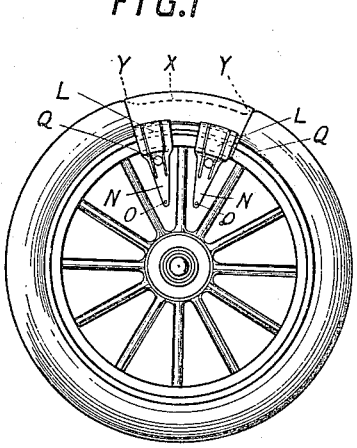
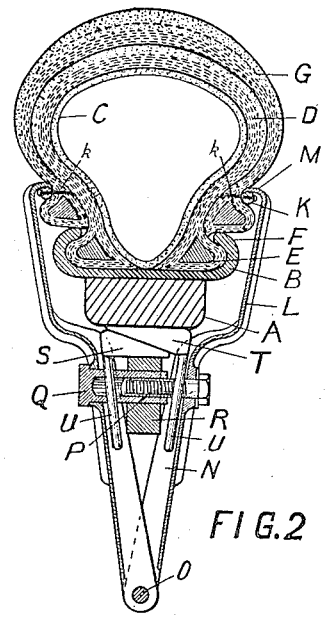
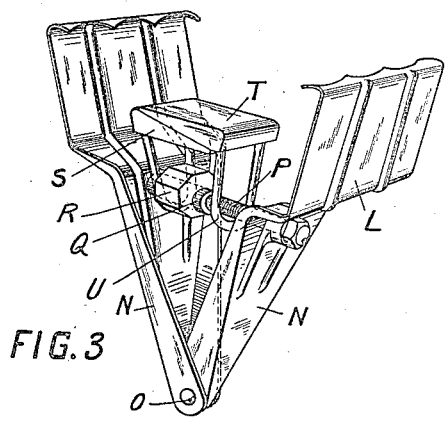

FRANK RUSSELL, OF SYDNEY, NEW SOUTH WALES, AUSTRALIA.

CLAMP FOR SECURING REPAIR-GAITERS ON PNEUMATIC TIRES.

1,147,976.

Specification of Letters Patent.

Patented July 27, 1915.

Application filed July 29, 1914. Serial No. 853,806.

*To all whom it may concern:*

Be it known that I, FRANK RUSSELL, a subject of the King of Great Britain and Ireland, residing at Civic Club, Pitt street, Sydney, New South Wales, Australia, have invented certain new and useful Improvements in Clamps for Securing Repair-Gaiters on Pneumatic Tires, of which the following is a specification.

This invention relates to means for attaching repair gaiters to punctured pneumatic tires for the purpose of patching and reinforcing the same where punctured and restoring them for use. In existing practice it is usual to jacket such tires where punctured with "boots" or "gaiters" tightly drawn around them by means of straps, a band or sleeve being sometimes also inserted between the inflatable air tube and the outer cover or tire proper to relieve the relatively light and wearable boot or gaiter from some of the outward pressure of the inner tube.

My invention consists in a jaw clamp fastener for tire boots or gaiters which operates to draw down the boot or gaiter tightly over the tread of the tire and also to press it against the sides of the tire. This clamp fastener enables the utilization as gaiters of cut sections from discarded tires, but it is usable also for securing specially constructed boots or gaiters.

The clamp fastener comprises a pair of pincer-like jaws adapted to grasp the gaiter above its beaded edges, means for closing and holding the jaws closed on the gaiter, and means for drawing the jaws radially toward the hub of the wheel, thereby to force the gaiter bead close down to the wheel rim and to maintain tension on the gaiter across the tread and thus completely support the tire in the locality of the puncture therein. To procure peripheral continuity of the tire tread, the rubber facing thereof should be pared away where covered by the repair gaiter, and to distribute the tension of the jaws on the gaiter beads and insure perfect stretching of the gaiter over the tire, said beads are each backed by a heavy wire or light rod adapted to be grasped by the clamp fingers. As these wires or rods are liable to slip out of position unless held positively while the clamp is being tightened they are secured to the gaiter by brads or thin nails, which are driven through holes in them and clenched over on the inside of the gaiter. One or more clamp fasteners may be used for each gaiter dependent on the length of the gaiter and the area affected by the puncture in the tire, a long puncture requiring a correspondingly long gaiter, and two, three or even four clamp fasteners for securing the same on the tire. In practice, extensively punctured pneumatic tires have been effectually restored by utilizing as a gaiter an appropriate length cut from a discarded tire, and using a plurality of clamp fasteners for holding such gaiter in position. Such a repair has enabled the punctured tire to be continued in ordinary use until completely worn out.

An inner sleeve is used to obviate chafing of the air tube, and prevent pinching of same in the broken part of the tire wall.

For a temporary repair, a relatively thin gaiter may be used. Such a gaiter may be specially constructed of three or four ply rubberized canvas with rubber tread and with beaded edges adapted to be engaged by the clamp fingers; or it may be formed by cutting down a section of a discarded tire until sufficiently thin to permit of it being used without necessitating the paring away of the tire tread to accommodate it. For a permanent repair patch, however, it is always preferable to use an unpared section of a discarded tire to form the gaiter, and to cut and pare away the rubber tread of the tire to provide a snug bed for the gaiter.

In the accompanying drawings, Figure 1 is a side elevation of a pneumatic tired wheel having the tire patched with a gaiter consisting of a length of discarded tire, secured by two clamps according to the present invention; Fig. 2 is a transverse section through the wheel felly and rim and the tire and gaiter and clamp (the internal reinforcing sleeve is not here shown); and Fig. 3 is a perspective view of the clamp, as made for an ordinary wood spoke wheel.

For use with wire wheels the jaws of the clamp are furcated to accommodate the close set spokes. While it would be practicable to construct these clamps with independently acting means for closing the jaws, and for drawing them down radially toward the hub, it is most convenient to adopt a construction in which the jaw closing movement effects also the radial drawing in of the clamp, and to provide means whereby the depth of the jaw of the clamp is accommodated to the depth of the wheel felly and rim. In practice the draw in movement is obtained by means of a pair of opposed wedges which have abutments against the intrados of the felly (or in the case of a wire wheel against the intrados of the rim) and a part of the clamp; it is most convenient to make this clamp abutment in the form of a polygonal sleeve eccentrically rotatable on a clamping bolt by means of which the jaws are brought together, but it may be otherwise supported by the clamp body, so that in the closing movement of the wedges tend to separate the abutments on the clamp and the wheel felly or rim respectively and so operate to draw the clamp radially onward toward the hub of the wheel.

A is the wheel felly, B the rim, C the air tube, D the tire cover, E the cover beads which are embraced by the rim lips F, G the gaiter, H the gaiter beads, K wire or rod tension distributer overlying the beads H, and secured to the gaiter by sprigs or nails k, L the clamp jaws, M inturned finger terminals of the jaws L, adapted to bite into the gaiter and to grip the wire K, N the clamp shanks, O fixed or withdrawable articulating rivet at lower ends of the shanks N, P clamp bolt, Q sleeve nut, R polygonal sleeve rotatable eccentrically in relation to the sleeve nut Q thereby to alter the distancing of the abutments for the pair of wedges, S and T, in relation to the abutment on the wheel structure, U bridles for retaining the wedges S and T loosely in position.

The clamps are preferably formed of sheet steel pressed to flanged and embossed form to obtain maximum rigidity without undue weight. It is not essential that the clamp arms be articulated by a rivet O. It will suffice if they are separable but engageable together at the point O when properly positioned.

When a section of a discarded tire is utilized to form a gaiter, the tip of the bead thereof is cut away to allow the bead to set close in against the sides of the cover and the top of the rim lip without disturbing the set of the cover beads in the rim lip, as shown best in Fig. 2. The clamps operate to deform the tire cover as there shown when tightened, effectually reinforcing the sides which are ordinarily found weak in the locality of a burst or cut. For a permanent patch the tread of the cover is cut away as shown by dotted lines X in Fig. 1 to allow the gaiter to set in nearly flush with the tread surface. The edges of the gaiter should always be trimmed away on the underside as shown at Y Y Fig. 1. An inside reinforcing sleeve is fixed between the air tube and the tire in the locality of the puncture. The wire or rod K is tacked to the gaiter by clenched nails or sprigs k in order to prevent said wire or rod "creeping", or slipping out of position while the repair is being made.

In the case of specially manufactured gaiters, the tension distributing wires K may be used to form the cores of the gaiter beads, in which case it is not necessary to use securing nails k.

In use, the cover is first pared away as shown at X in the locality of the puncture if a thick permanent gaiter is to be fitted and the gaiter set over the pared place; but in the case of temporary gaiters, the gaiter is pared thin and the tire is not pared. One or more clamps are then fixed so that the jaw fingers thereof engage over the distributing rods K overlying the gaiter beads, and the sleeve R is turned so as to present an abutment face for the wedge T at such a distance from the intrados of the felly or rim that the two wedges S and T will set tightly when the claws L are closed and act to draw the clamp bodily toward the hub of the wheel. The bolt P is now turned till the gaiter is drawn down tightly over the cover tread and compressed inward at the sides, as best indicated in Fig. 2.

What I claim as my invention and desire to secure by Letters Patent is:—

1. A pneumatic tire repair gaiter clamp having jaws articulated together at the shanks, a bolt and sleeve nut passing through said jaws, an adjustable abutment carried on said sleeve nut, and opposed wedges working over said abutment and adapted to press against the intrados of the wheel felly when slid together by the closing movement of the jaws.

2. In a pneumatic tire repair gaiter clamp, the combination of a pair of opposed jaws with claw terminals, articulated shanks to said claws, a through-bolt and sleeve nut operative for closing said jaws, and riding wedges working on an adjustable abutment carried by the clamp and adapted to bear against the intrados of a wheel felly.

3. A pneumatic tire repair gaiter, comprising articulated closable grip jaws, a through bolt for closing same, tension distributing bead pads engageable by said jaws, riding wedges acting against the wheel structure and adapted to be moved in said closing movement, and an adjustable abutment in the clamp for said wedges.

4. A pneumatic repair gaiter clamp comprising a pair of opposed clamp jaws articulated together and adapted to inclose the wheel rim and felly, a bolt passing through the said clamp jaws transversely between their point of articulation and the intrados of the wheel felly, and means operated by the tightening of said bolt to press against the intrados of the wheel felly and draw the whole clamp radially inward toward the wheel hub.

In testimony whereof I have affixed my signature in presence of two witnesses.

FRANK RUSSELL.

Witnesses:
S. BECK,
W. J. DAVIS.